(12) United States Patent
Toyota (10) Patent No.: US 9,662,998 B2
(45) Date of Patent: May 30, 2017

(54) ELECTRIC VEHICLE GEAR SHIFTING CONTROL DEVICE

(71) Applicant: Nissan Motor Co., Ltd., Yokohama-shi, Kanagawa (JP)

(72) Inventor: Ryohey Toyota, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 77 days.

(21) Appl. No.: 14/646,022

(22) PCT Filed: Oct. 31, 2013

(86) PCT No.: PCT/JP2013/079510
§ 371 (c)(1),
(2) Date: May 20, 2015

(87) PCT Pub. No.: WO2014/103503
PCT Pub. Date: Jul. 3, 2014

(65) Prior Publication Data
US 2015/0283920 A1    Oct. 8, 2015

(30) Foreign Application Priority Data

Dec. 26, 2012 (JP) ................................. 2012-282380

(51) Int. Cl.
*B60L 15/20* (2006.01)
*B60L 7/24* (2006.01)
(Continued)

(52) U.S. Cl.
CPC ............ *B60L 15/2054* (2013.01); *B60L 7/14* (2013.01); *B60L 7/18* (2013.01); *B60L 7/24* (2013.01);
(Continued)

(58) Field of Classification Search
CPC .... F16H 61/16; F16H 61/10; F16H 2061/161; F16H 2061/163; B60W 30/19
See application file for complete search history.

(56) References Cited

U.S. PATENT DOCUMENTS 5,025,684 A    6/1991    Stehle et al.
6,126,251 A   10/2000    Yoshii et al.
(Continued)

FOREIGN PATENT DOCUMENTS

CN            1618649 A      5/2005
CN          101428563 A      5/2009
(Continued)

*Primary Examiner* — Todd Melton
(74) *Attorney, Agent, or Firm* — Global IP Counselors, LLP (57) ABSTRACT

A drivetrain from a drive source to drive wheel is provided with a motor-generator for implementing regeneration during deceleration and an automatic transmission having an engaging clutch as a shifting element. The electric vehicle has a gear shifting controller that is programmed to assess whether to grant gear shifting permission based on whether a deceleration grade difference occurring as a result of a reengagement gear shifting is less than a prescribed acceptable deceleration fluctuation when a reengagement gear shift request involving disengaging or engaging the meshing clutch is made during deceleration or regeneration. Shifting is initiated according to the gear-shift request if a decision to grant gear shifting permission is made.

6 Claims, 9 Drawing Sheets

(51) Int. Cl.
*F16H 61/16* (2006.01)
*B60L 7/14* (2006.01)
*B60L 7/18* (2006.01)
*B60L 7/26* (2006.01)
*B60L 11/12* (2006.01)
*B60L 11/14* (2006.01)
*F16H 61/10* (2006.01)

(52) U.S. Cl.
CPC ............. *B60L 7/26* (2013.01); *B60L 11/123* (2013.01); *B60L 11/14* (2013.01); *B60L 15/2009* (2013.01); *F16H 61/16* (2013.01); *B60L 2210/40* (2013.01); *B60L 2240/12* (2013.01); *B60L 2240/423* (2013.01); *B60L 2240/486* (2013.01); *B60L 2270/145* (2013.01); *F16H 61/10* (2013.01); *Y02T 10/6217* (2013.01); *Y02T 10/645* (2013.01); *Y02T 10/7077* (2013.01); *Y02T 10/7241* (2013.01); *Y02T 10/7275* (2013.01); *Y10S 903/945* (2013.01)

(56) References Cited

U.S. PATENT DOCUMENTS

| | | | |
|---|---|---|---|
| 7,090,612 B2* | 8/2006 | Ozeki | B60K 6/365 477/3 |
| 7,198,335 B2 | 4/2007 | Choi | |
| 8,812,203 B2* | 8/2014 | Minamikawa | B60K 6/445 701/22 |
| 2012/0010677 A1 | 1/2012 | Wenzel et al. | |
| 2013/0296100 A1* | 11/2013 | Nefcy | B60W 10/08 477/4 |

FOREIGN PATENT DOCUMENTS

| | | |
|---|---|---|
| CN | 101450663 A | 6/2009 |
| EP | 1433642 A1 | 6/2004 |
| JP | 3-117776 A | 5/1991 |
| JP | 7-264711 A | 10/1995 |
| JP | 2000-274525 A | 10/2000 |
| JP | 2006-226354 A | 8/2006 |
| JP | 2010-116121 A | 5/2010 |

\* cited by examiner

ELECTRIC VEHICLE GEAR SHIFTING CONTROL DEVICE

CROSS-REFERENCE TO RELATED APPLICATIONS

This application is a U.S. National stage application of International Application No. PCT/JP2013/079510, filed Oct. 31, 2013, which claims priority to Japanese Patent Application No. 2012-282380 filed in Japan on Dec. 26, 2012. The entire disclosure of the Japanese Patent Application No. 2012-282380 is hereby incorporated herein by reference.

BACKGROUND

Field of the Invention

The present invention relates to a device for controlling gear shifting in an electric vehicle a drivetrain of which is provided with a motor-generator that engages in regeneration during deceleration and an automatic transmission comprising a meshing clutch as a shifting element.

Background Information

There are known in the prior art braking devices for electric vehicles capable of regenerative braking, it being an object thereof to prevent a drop in braking force when gears are shifted in the electric vehicles, and to prevent the incidence of shock when the gears are shifted; and, when regenerative braking is being performed, shifting gears in an automatic transmission is prohibited (see, for example, Japanese Laid-Open Patent Application 7-264711).

SUMMARY

However, a conventional braking device for an electric vehicle is configured so as to uniformly prohibit shifting during regeneration, resulting in the problems that the motor operating point is sub-optimal and electrical efficiency decreases.

The present invention was designed in view of the problems described above, it being an object thereof to provide a device for controlling gear shifting in an electric vehicle that allows for improved electrical efficiency by improving the motor operating point when there is a gear-shift request during deceleration/regeneration.

In order to achieve the object proposed above, an electric vehicle according to the present invention has a drivetrain extending from a drive source to drive wheels, the drivetrain being provided with motor-generator that performs regeneration during deceleration and an automatic transmission that comprises a meshing clutch as a shifting element. An electric vehicle gear shifting control device for the electric vehicle comprises a gear shifting controller that is programmed to assess whether to grant gear shifting permission based on whether a deceleration grade difference occurring as a result of a reengagement gear shifting is less than a prescribed acceptable deceleration fluctuation when a reengagement gear shift request involving disengaging or engaging the meshing clutch is made during deceleration or regeneration. Shifting is initiated according to the gear-shift request if a decision to grant gear shifting permission is made.

Thus, if an assessment indicates that a gear-shift request made during deceleration/regeneration is one using the meshing clutch as a disengaging element or an engaging element, a decision is made by the gear shifting permission assessment means whether to grant gear shifting permission based on the magnitude of the regeneration torque. If a decision to gear shifting permission is made, shifting is initiated by the gear-shift initiation means according to the gear-shift request. Specifically, when a gear-shift request is made during deceleration/regeneration, the frequency at which shifting is possible increases so that shifting is initiated according to the gear shifting permission assessment based on the magnitude of the regeneration torque. The length of time for which the motor-generator can operate at an efficient operating point is thus increased over cases in which shifting is uniformly prohibited during deceleration/regeneration, improving motor efficiency. As a result, it is possible to improve the motor operating point when there is a gear-shift request during deceleration/regeneration, thereby improving electrical efficiency.

BRIEF DESCRIPTION OF THE DRAWINGS

Referring now to the attached drawings which form a part of this original disclosure.

DETAILED DESCRIPTION OF THE EMBODIMENTS

A best mode for carrying out the device for controlling gear shifting in an electric vehicle according to the present invention is described below based on a first embodiment and a second embodiment shown in the drawings.

Embodiment 1

First, the configuration of the first embodiment will be described. The configuration of a shift control device installed in an electric automobile (an example of an electric vehicle) according to the first embodiment will be described in terms of "Overall system configuration," "Detailed configuration of the shift control system," and "Configuration of the shift control process."

Overall System Configuration

Figure 1:
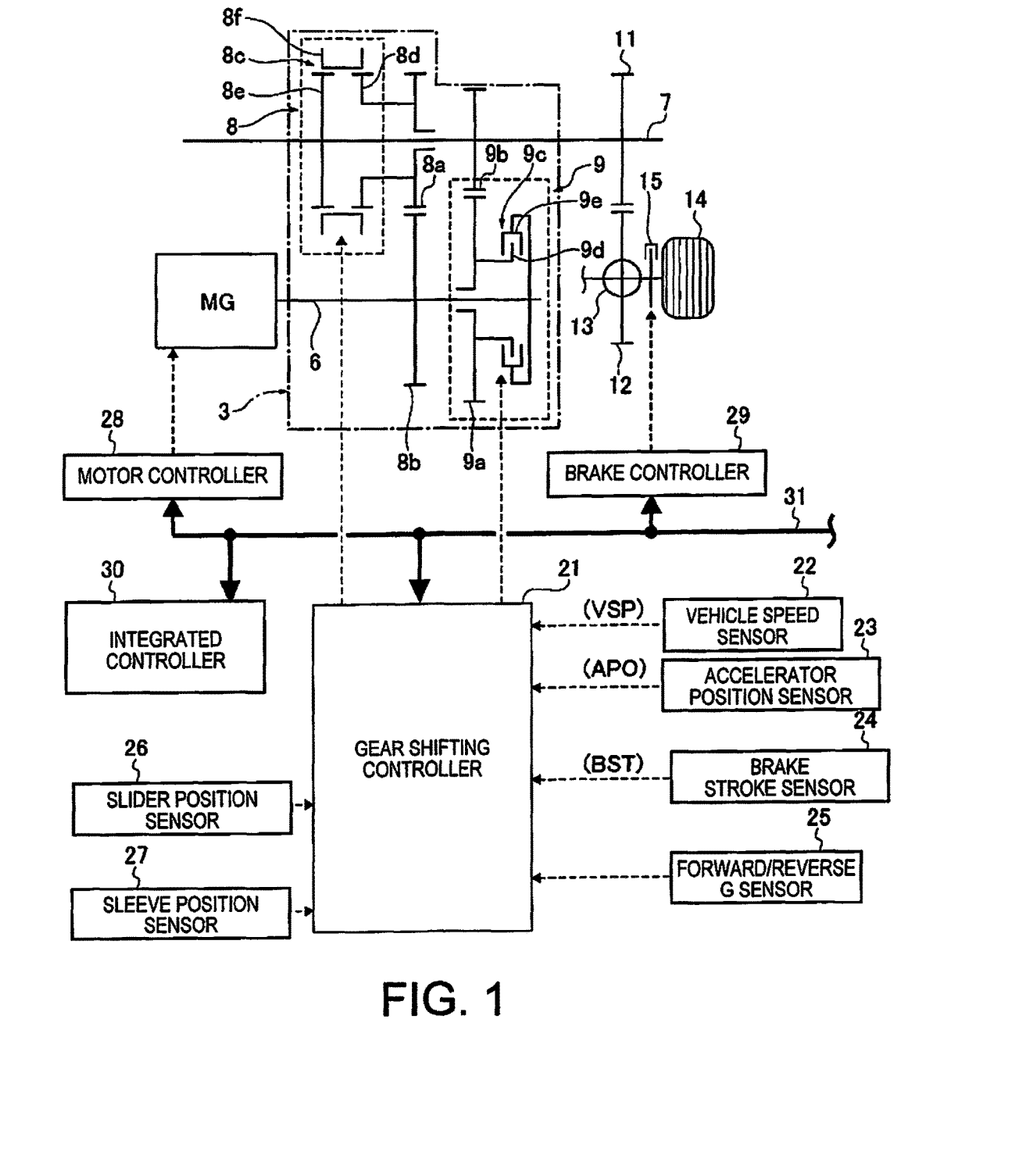
FIG. 1 is an overall schematic system configuration diagram of a drivetrain configuration and control system configuration of an electric automobile (one example of an electric vehicle) to which a shift control device according to a first embodiment has been applied.

FIG. 1 shows a drivetrain configuration and a control system configuration of an electric automobile to which the shift control device according to the first embodiment has been applied. The following is a description of the overall system configuration based on FIG. 1.

The drivetrain configuration of the electric automobile is provided with a motor-generator MG, an automatic transmission 3, and a drive wheel 14, as shown in FIG. 1.

The motor-generator MG is used as a drive motor during motoring and as a generator during regeneration, a motor shaft of the motor-generator MG being connected to a transmission input shaft 6 of the automatic transmission 3.

The automatic transmission 3 is a constant-meshing stepped transmission that transmits power using one of two gear pairs having different gear ratios, and is a two-level transmission having a high gear stage (high speed gear) of a low reduction ratio and a low gear stage (low speed gear) of a high reduction ratio. The automatic transmission 3 is configured from a low-side transmission mechanism 8 constituting the low speed stage and a high-side transmission mechanism 9 constituting the high speed stage. The transmission input shaft 6 and a transmission output shaft 7 are disposed in parallel.

The low-side transmission mechanism 8 is used to select a low-side power transmission path, and is disposed over the transmission output shaft 7. The low-side transmission mechanism 8 is configured from an engaging clutch 8c (meshing clutch) that meshingly engages and disengages a gear 8a with the transmission output shaft 7 so that a low speed stage gear pair (gear 8a, gear 8b) is drivingly joined to the transmission input and output shafts 6, 7. The low speed stage gear pair is configured from the gear 8a, which is rotatably supported over the transmission output shaft 7, and the gear 8b, which meshes with the gear 8a and co-rotates with the transmission input shaft 6.

The high-side transmission mechanism 9 is used to select a high-side power transmission path, and is disposed over the transmission input shaft 6. The high-side transmission mechanism 9 is configured from a friction clutch 9c that frictionally engages and disengages a gear 9a with the transmission input shaft 6 so that a high speed stage gear pair (gear 9a, gear 9b) is drivingly joined to the transmission input and output shafts 6, 7. The high speed stage gear pair is configured from the gear 9a, which is rotatably supported over the transmission input shaft 6, and the gear 9b, which meshes with the gear 9a and co-rotates with the transmission output shaft 7.

A gear 11 is secured to the transmission output shaft 7, and a differential gear device 13 is drive-coupled to the transmission output shaft 7 via a final drive gear set configured from a fixed gear 11 and a gear 12 that meshes with the gear 11. Motor power reaching the transmission output shaft 7 from the motor-generator MG is thus transmitted to left and right drive wheels 14 (only one of which is shown in FIG. 1) via the final drive gear set 11, 12 and the differential gear device 13.

The control system configuration of the electric automobile is provided with a gear shifting controller 21, a vehicle speed sensor 22, an accelerator position sensor 23, a brake stroke sensor 24, a forward/reverse G sensor 25, a slider position sensor 26, a sleeve position sensor 27, and the like, as shown in FIG. 1. Also provided are a motor controller 28, a brake controller 29, an integrated controller 30, a CAN communication line 31, and a range position switch 32.

When shifting up to the high gear stage in a state in which the low gear stage, in which the engaging clutch 8c is meshingly engaged and the friction clutch 9c is disengaged, is selected, the gear shifting controller 21 implements reengagement control by disengaging the engaging clutch 8c and frictionally engaging the friction clutch 9c. The engaging clutch 8c engages in gear shift control by meshingly engaging the engaging clutch 8c and disengaging the friction clutch 9c when downshifting to the low gear stage in a state in which the high gear stage, in which the engaging clutch 8c is disengaged and the friction clutch 9c is frictionally engaged, is selected. Specifically, in upshifting, the engaging clutch 8c constituted by a meshing clutch is the disengaging element, and in downshifting, the engaging clutch 8c constituted by a meshing clutch is the engaging element.

Detailed Configuration of Shift Control System

Figure 2:
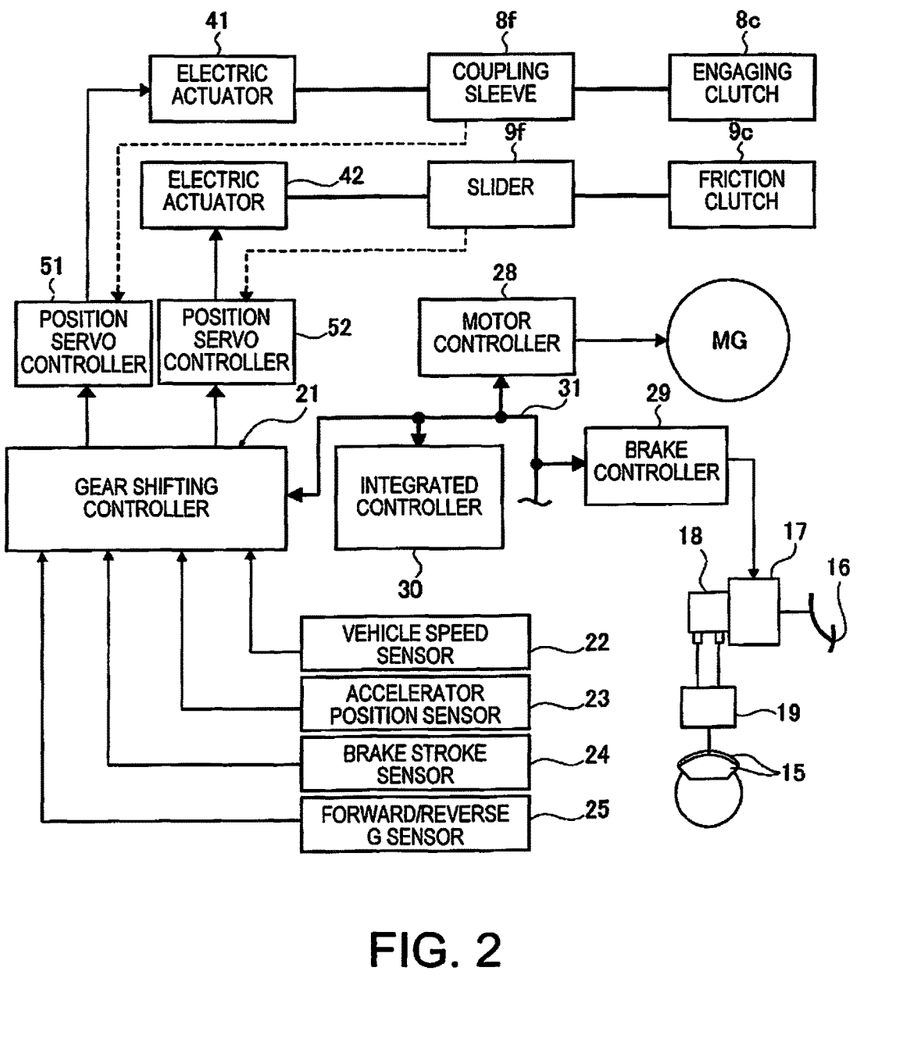
FIG. 2 is a control block diagram showing the detailed configuration of a shift control system of the first embodiment.

FIG. 2 shows the detailed configuration of the shift control system of the first embodiment. The detailed configuration of the shift control system will now be described with reference to FIG. 2.

Within the control system of the electric automobile, the shift control system is provided with the engaging clutch 8c, the friction clutch 9c, the motor-generator MG, a hydraulic brake 15, the gear shifting controller 21, and the integrated controller 30, as shown in FIG. 2. Specifically, the engaging clutch 8c and the friction clutch 9c engage in shift control based on commands from the gear shifting controller 21, and the motor-generator MG and the hydraulic brake 15 engage in regenerative coordinated braking control based on commands from the integrated controller 30.

The engaging clutch 8c is a synchromesh clutch that comprises a clutch gear 8d provided on the gear 8a, a clutch hub 8e joined to the transmission output shaft 7, and a coupling sleeve 8f (see FIG. 1). An electric actuator 41 engages and disengages the enmeshment of the clutch by driving the coupling sleeve 8f to stroke. The meshing engagement and disengagement of the engaging clutch 8c are determined by the position of the coupling sleeve 8f; the gear shifting controller 21 being provided with a position servo controller 51 (such as a PID-controlled position servo system) that reads the value indicated by the sleeve position sensor 27 and applies an electrical current to the electric actuator 41 so that the sleeve goes to a meshing engaged position or a disengaged position. When the coupling sleeve 8f is in the meshed position shown in FIG. 1, in which the sleeve is meshed with both the clutch gear 8d and outer clutch teeth of the clutch hub 8e, the gear 8a is drivingly coupled to the transmission output shaft 7. Conversely, when the coupling sleeve 8f shifts in an axial direction away from the position shown in FIG. 1, thereby reaching a position where the sleeve is unmeshed from either the clutch gear 8d or the outer clutch teeth of the clutch hub 8e, the gear 8a is disconnected from the transmission output shaft 7.

The friction clutch 9c comprises a driven plate 9d that co-rotates with the clutch gear 9a, and a drive plate 9e that co-rotates with the transmission input shaft 6 (see FIG. 1).

An electric actuator 42 drives a slider 9f that applies pressing force to the plates 9d, 9e, thereby frictionally engaging or disengaging the clutch. The torque transmission capacity of the friction clutch 9c is determined by the position of the slider 9f, which is a screw mechanism that retains its position when the input from the electric actuator 42 is 0 (zero). The gear shifting controller 21 is provided with a position servo controller 52 (such as a PID-controlled position servo system) that reads the value indicated by the slider position sensor 26 and applies an electrical current to the electric actuator 42 so that the slider goes to a position at which the desired torque transmission capacity is yielded. The friction clutch 9c rotates integrally with the transmission input shaft 6, the friction clutch 9c drive-coupling the gear 9a to the transmission input shaft 6 when the clutch is frictionally engaged and releasing the drive-coupling of the gear 9a and the transmission input shaft 6 when the clutch is disengaged.

The motor-generator MG is subjected to motoring control or regeneration control by the motor controller 28, to which commands outputted by the integrated controller 30 are inputted. Specifically, when a motor torque command is inputted to the motor controller 28, the motor-generator MG is subjected to motoring control. When a regeneration torque command is inputted to the motor controller 28, the motor-generator MG is subjected to regeneration control.

The hydraulic brake 15 applies hydraulic braking force to the drive wheel 14 using brake fluid supplied via a path flowing in the stated order through a brake pedal 16, an electric booster 17, a master cylinder 18, and a brake hydraulic actuator 19. When a brake hydraulic pressure command is inputted to the brake controller 29 during regenerative coordinated braking control, the hydraulic brake 15 outputs a drive command to the electric booster 17 according to the division of hydraulic braking force, thereby controlling brake hydraulic pressure. Regenerative coordinated braking control refers to control in which requested braking force (or requested deceleration G), which is calculated based on the brake stroke level indicated by the brake stroke sensor 24, is achieved via a division of regenerative braking force and hydraulic braking force. As a rule, in order to improve electrical efficiency, the regenerative braking force is determined according to the maximum regeneration torque possible at the moment, with the difference between the requested braking force and the regenerative braking force being supplied by hydraulic braking force.

Information from the vehicle speed sensor 22, the accelerator position sensor 23, the brake stroke sensor 24, the forward/reverse G sensor 25, and the like is inputted to the gear shifting controller 21, which engages in upshift and downshift control of the automatic transmission 3 using a shift map (FIG. 5) or the like.

Shift Control Process Configuration

Figure 3:
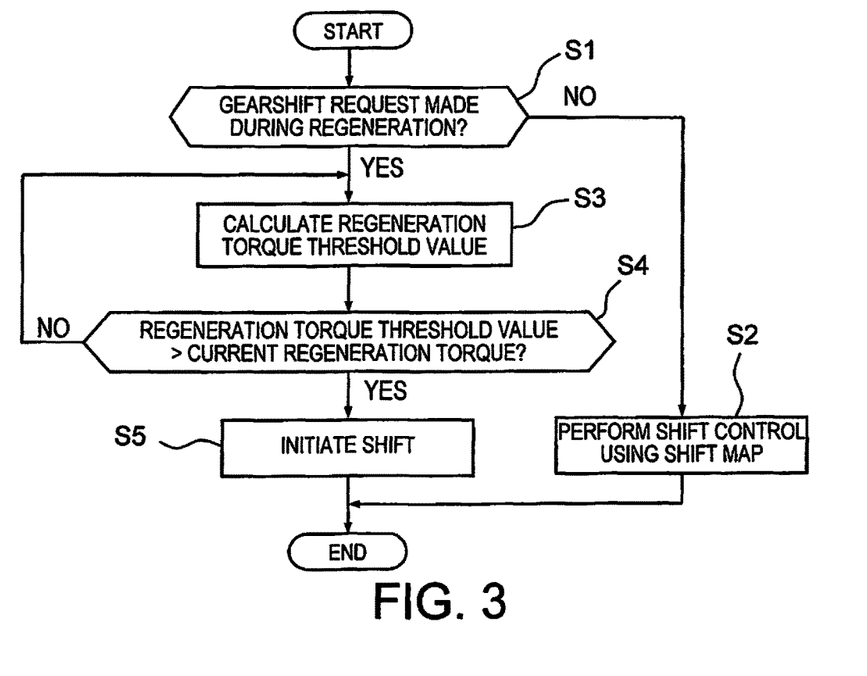
FIG. 3 is a flow chart showing a shift control process executed by a gear shifting controller of the first embodiment.

FIG. 3 shows a shift control process executed by the gear shifting controller 21 of the first embodiment. The various steps making up the configuration of the shift control process will now be described with reference to FIG. 3.

In step S1, it is assessed whether an upshift or downgearshift request has been made during deceleration/regeneration. If YES (i.e., a gear-shift request has been made during regeneration), the process continues to step S3; if NO (i.e., a gear-shift request has not been made during regeneration), the process continues to step S2 (gear-shift request assessment means). In the case of the automatic transmission 3 of the first embodiment, the engaging clutch 8c is the disengaging element in gearshift-effected upshifts, and the engaging clutch 8c is the engaging element in gearshift-effected downshifts; thus, the assessment is to determine whether a request has been made to shift between two shift stages during regeneration.

In step S2, following the assessment in step S1 indicating that a gear-shift request has not been made during regeneration, ordinary shift control based on a shift map (FIG. 5) is performed, and the process ends.

In step S3, following the assessment in step S1 indicating that a gear-shift request has been made during regeneration or the assessment in step S4 indicating that regeneration torque magnitude conditions have not been met, a regeneration torque threshold value (absolute value) is calculated, and the process continues to step S4 (regeneration torque threshold value calculation means). The regeneration torque threshold value is set to a value such that, when loss in the torque being transmitted through the drivetrain by a gear shift using the meshing clutch 8c occurs, the torque loss is of a level that is acceptable to the driver. Specifically, when loss in the torque being transmitted through the drivetrain occurs due to a momentary neutral state being entered during a gear shift transitional period using the meshing clutch 8c, an acceptable deceleration G fluctuation that is acceptable to the driver as a deceleration grade difference is determined. The regeneration torque threshold value is then calculated using the determined acceptable deceleration G fluctuation, the gear ratio of the pre-shift gear stage, tire radius (a vehicle factor), and estimated vehicle weight (another vehicle factor) according to the following formula:

$$\text{Regeneration torque threshold value} = \text{acceptable deceleration G fluctuation}/\{\text{gear ratio}/(\text{tire radius} \times \text{estimated vehicle weight})\}$$

Figure 4:
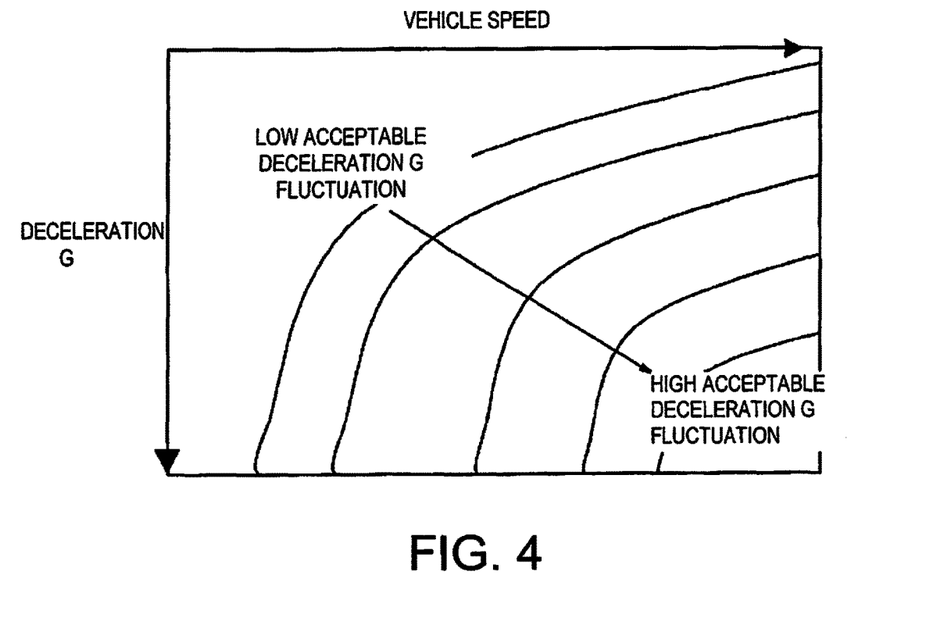
FIG. 4 is an acceptable G fluctuation map diagram showing examples of acceptable deceleration G fluctuations determined according to vehicle speed and deceleration G when calculating a threshold value for the shift control process.

Then, in step S3, the acceptable deceleration G fluctuation for each calculation cycle is determined using the acceptable deceleration G fluctuation map shown in FIG. 4. Specifically, the value for acceptable deceleration G fluctuation increases as the vehicle speed indicated by the vehicle speed sensor 22 increases, and the value for acceptable deceleration G fluctuation increases as the actual deceleration absolute value indicated by the forward/reverse G sensor 25 increases.

In step S4, following the calculation of the regeneration torque threshold value in step S3, an assessment is made as to whether to grant gear shifting permission based on whether the current magnitude of regeneration torque (absolute value of regeneration torque) is less than the regeneration torque threshold value calculated in step S3. If YES (i.e., regeneration torque threshold value>current regeneration torque), the process continues to step S5; if NO (i.e., regeneration torque threshold value≤current regeneration torque), the process returns to step S3 (gear shifting permission assessment means).

In step S5, following the assessment in step S4 indicating that the regeneration torque threshold value is greater than the current regeneration torque, shifting is initiated according to the gear-shift request (upshift or downshift) from step S1, and the process ends (gear-shift initiation means).

Next, the operation of the first embodiment will be described. First, the prior art will be described. The operation of the shift control device of the electric automobile according to the first embodiment will then be described in terms of ordinary shift control operation and shift control operation during regeneration when a gear-shift request is made.

We will now consider a case in which the automatic transmission 3 upshifts while the motor-generator MG is implementing regeneration in an electric automobile having the drivetrain configuration of the first embodiment.

When the automatic transmission 3 upshifts during regeneration, the engaging clutch 8c cannot transmit torque while maintaining differential rotation like the friction clutch 9c; thus, the engaging clutch 8c is first disengaged, after which the friction clutch 9c is engaged. Thus, when an upshift is performed during regeneration, the automatic transmission 3 enters a momentary neutral state during an upshift transitional period from when the engaging clutch 8c is disengaged to when the friction clutch 9c is engaged. This leads to the occurrence of torque loss, in which the regeneration torque (negative torque) transmitted via the drivetrain extending from the motor-generator MG to the drive wheel 14 becomes zero, imparting the driver with a sense of discomfort.

When the automatic transmission 3 downshifts during regeneration, the engaging clutch 8c cannot transmit torque while maintaining differential rotation like the friction clutch 9c. Thus, the friction clutch 9c is first disengaged, followed by the differential rotation of the engaging clutch 8c being synchronized by the motor-generator MG, after which the engaging clutch 8c is meshingly engaged. As a result, the automatic transmission 3 enters a momentary neutral state during a downshift transitional period, as in the case of upshifts, thereby creating torque loss and creating a highly unnatural feel for the driver.

Thus, in order to prevent an unnatural feel caused by torque loss, shifting is prohibited during regenerative braking, as proposed, for example, in Laid-open Japanese Patent Application No. H07-264711. However, because shift control is performed according to vehicle speed and requested motor torque so as to achieve an optimal motor operating point, uniformly prohibiting shifting during regeneration shortens the length of time during which the motor can be operated at an efficient operating point, thus reducing electrical efficiency.

Ordinary Shift Control Operation

When the motor-generator MG is motoring or when the automatic transmission 3 does not upshift or down during while the motor-generator MG is regenerating, shift control is performed so that an optimal motor operating point is achieved. The operation of shift control performed under ordinary circumstances reflecting such conditions (i.e., during motoring or during regeneration when no gear-shift requests are made) will now be described with reference to FIGS. 3 and 5.

Figure 5:
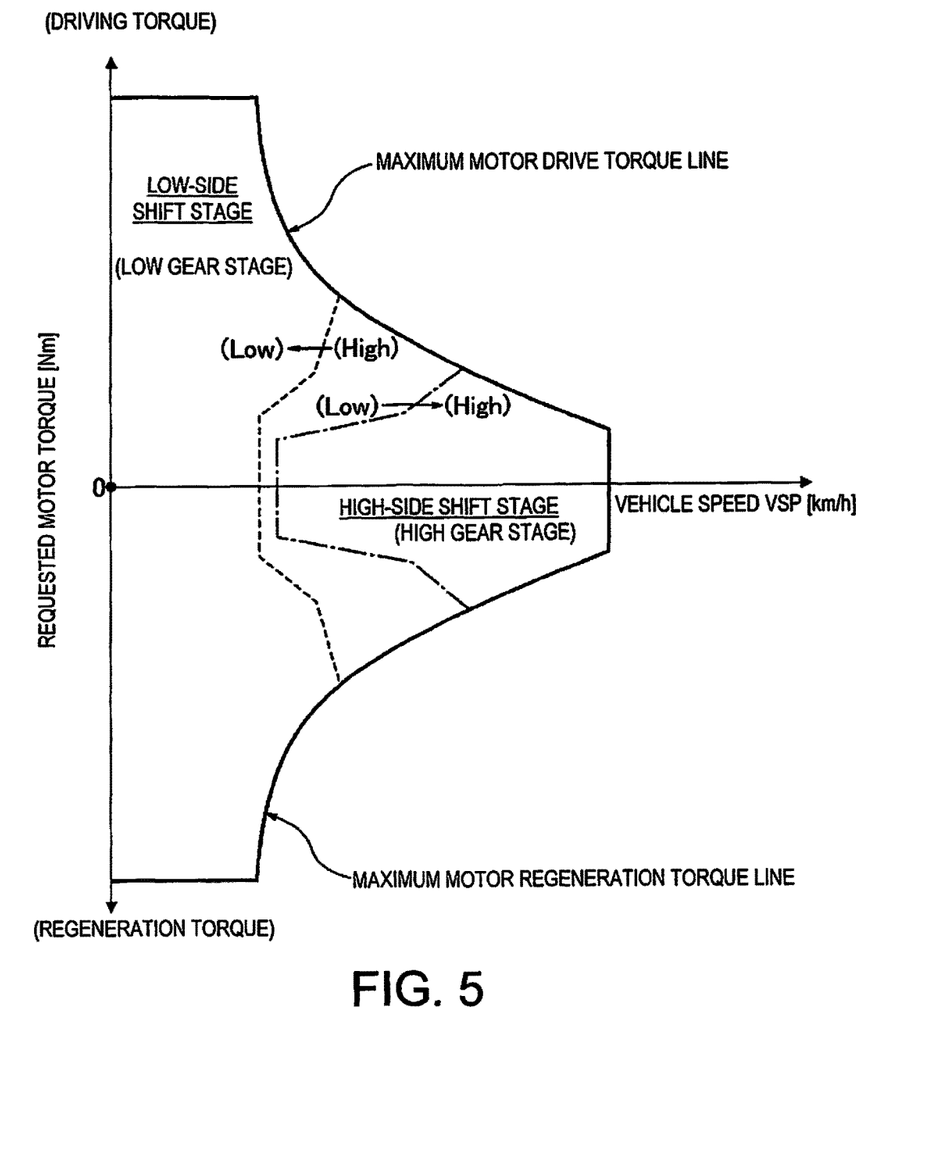
FIG. 5 is a shift map diagram showing examples of an upshift line and a downshift line of an automatic transmission used during motoring and during regeneration when there is no gear-shift request input.

During motoring or when an assessment indicates that a gear-shift request has not been made during regeneration, the process running from step s1 through step S2 to END in the flow chart shown in FIG. 3 is repeated, and, in step S2, ordinary shift control using the shift map shown in FIG. 5 is executed.

During ordinary shift control, a vehicle speed VSP from the vehicle speed sensor 22, an accelerator position APO from the accelerator position sensor 23, and a brake stroke level BST from the brake stroke sensor 24 are inputted to the gear shifting controller 21. Shift control of the automatic transmission 3 is then performed as described below based on this inputted information and the example shift map shown in FIG. 5.

In the shift map shown in FIG. 5, the bold lines indicate a maximum motor drive torque line obtained by connecting the maximum motor drive torque values for a motor-generator MG2 at various vehicle speeds VSP and a maximum motor regeneration torque line obtained by connecting the maximum motor regeneration torque values for the motor-generator MG2 at various vehicle speeds VSP, and the region surrounded by these lines is an achievable region.

In the achievable region, an upshift line (Low→High) indicated by a dotted-dashed line and a downshift line (High→Low) indicated by a dashed line are set taking the transmission loss of the automatic transmission 3 and the motor loss of the motor-generator MG2 into account. The upshift line (Low→High) is set closer to the high vehicle speed side than the downshift line (High→Low) by an amount equivalent to hysteresis.

When the accelerator pedal is being depressed and the vehicle is traveling, the gear shifting controller 21 determines the operating point based on the vehicle speed VSP and the requested motor driving torque requested by the accelerator position APO. Conversely, during braking when the brake pedal is being depressed, the operating point is determined based on the vehicle speed VSP and the requested motor regeneration torque requested by the brake stroke level BST. When the operating point has been determined, a target shift stage (low gear stage or high gear stage) suitable for the current operating state is determined according to whether the operating point is present in the low-side shift stage region or the high-side shift stage region of the shift map shown in FIG. 5.

When motoring, in which the requested motor torque is driving torque, is being performed and the low gear stage is selected, an upgear-shift request to switch the target shift stage to the high gear stage is outputted when the operating point in the achievable region crosses the upshift line (Low→High) and enters the high-side shift stage region. When an upgear-shift request is made, the engaging clutch 8c, which is in a meshed engaged state, is immediately disengaged, after which a gear shift-effected upshift is executed by frictionally engaging the friction clutch 9c, which is in a disengaged state.

Conversely, when motoring, in which the requested motor torque is driving torque, is being performed and the high gear stage is selected, a downgear-shift request to switch the target shift stage to the low gear stage is outputted when the operating point in the achievable region crosses the downshift line (High→Low) and enters the low-side shift stage region. When a downgear-shift request is made, the frictionally engaged friction clutch 9c is immediately disengaged, followed by the differential rotation of the engaging clutch 8c being synchronized by the motor-generator MG, after which a gear shift-effected downshift is executed by meshingly engaging the engaging clutch 8c.

When a gear-shift request is not made during regeneration and the shift stage when regeneration is initiated is the low gear stage, the selection of the low gear stage, in which the engaging clutch 8c is meshingly engaged and the friction clutch 9c is disengaged, is maintained. When the shift stage when regeneration is initiated is the high gear stage, the selection of the high gear stage, in which the friction clutch 9c is frictionally engaged and the engaging clutch 8c is disengaged, is maintained.

Shift Control Operation During Regeneration When A Gear-shift Request is Made

When an upgear-shift request or downgear-shift request is made while the motor-generator MG is implementing regeneration, a decision regarding whether to grant gear shifting permission is made based on the magnitude of the regeneration torque. The operation of shift control performed when regeneration when a gear-shift request is made reflecting such conditions will now be described with reference to FIGS. 3, 6, and 7.

When an upshift or downshift is made during regenerative braking, torque loss occurs as described above; however, if the regeneration torque is low, there is little deceleration due to torque loss, and the driver does not experience an unnatural feel. The shift control performed during regeneration when a gear-shift request is made of the first embodiment focuses on this point.

When an assessment indicates that a gear-shift request has been made during regeneration, steps S1, S3, and S4 shown in the flow chart of FIG. 3 are performed in that order. In step S3, the regeneration torque threshold value is calculated. In step S4, an assessment is made as to whether to grant gear shifting permission based on whether the current regeneration torque is less than the regeneration torque threshold value calculated in step S3. As long as the assessment performed in step S4 indicates NO (i.e., regeneration torque threshold value≤current regeneration torque), steps S3 and S4 are repeated in that order, and gear shifting permission assessments are repeated using the regeneration torque threshold value calculated at a predetermined cycle. When the assessment performed in step S4 indicates YES (i.e., regeneration torque threshold value>current regeneration torque), the process continues to step S5, then ends. In step S5, shifting is initiated according to the gear-shift request (upshift or downshift) calculated in step S1.

Figure 7:
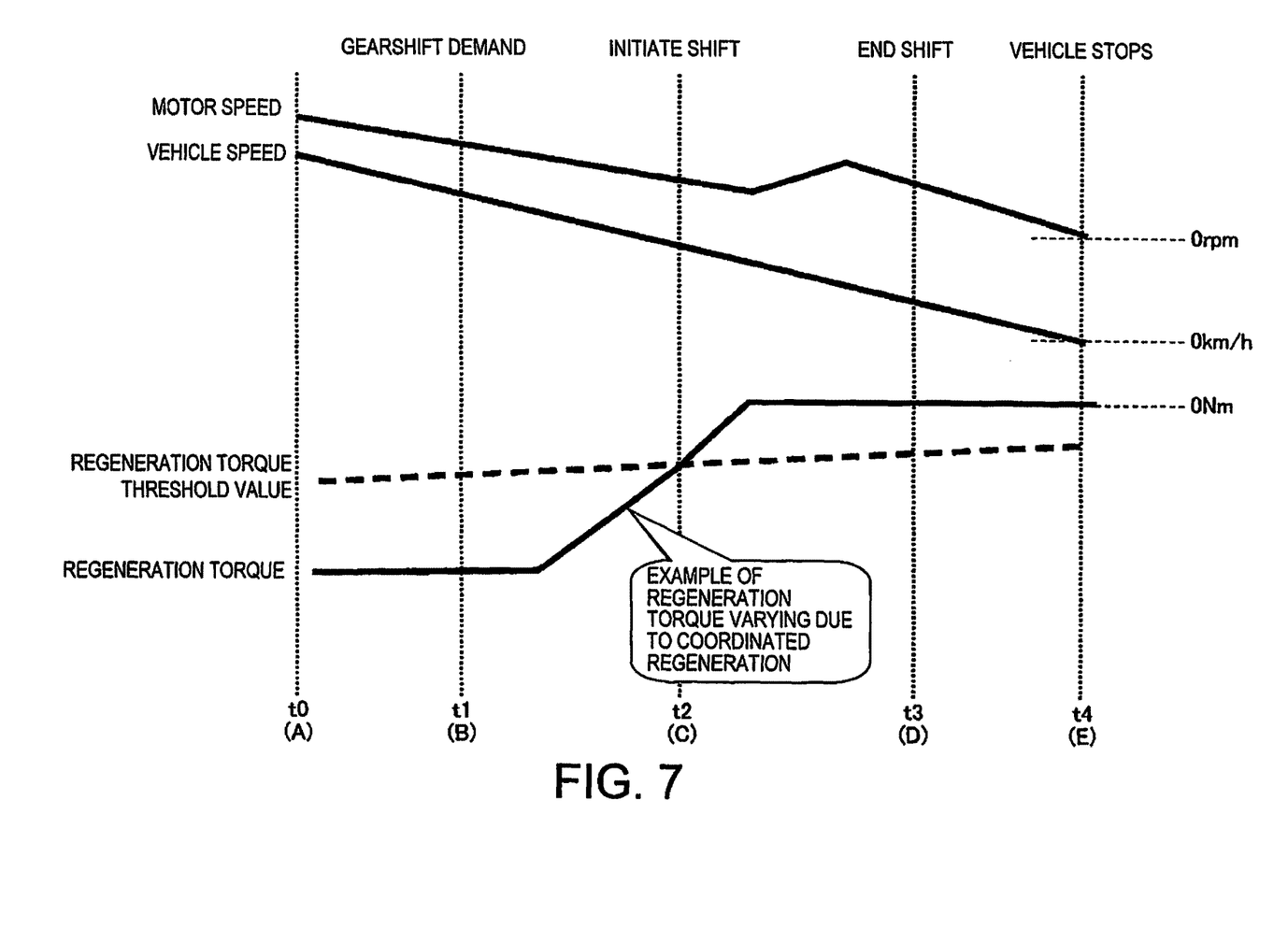
FIG. 7 is a time chart showing the properties of motor speed, vehicle speed, regeneration torque threshold value, and regeneration torque when a downgear-shift request is inputted during a regenerative deceleration until coming to a stop in an electric automobile equipped with the shift control device of the first embodiment.

Next, the operation of shift control performed when a downgear-shift request is made during the period from when an electric automobile equipped with the shift control device of the first embodiment begins regenerative deceleration to when the vehicle stops will be described using the time chart shown in FIG. 7. In FIG. 7, t0 is a regenerative deceleration initiation time, t1 is a gear-shift request time, t2 is a shift initiation time, t3 is a shift ending time, and t4 is a vehicle stop time.

Figure 6:
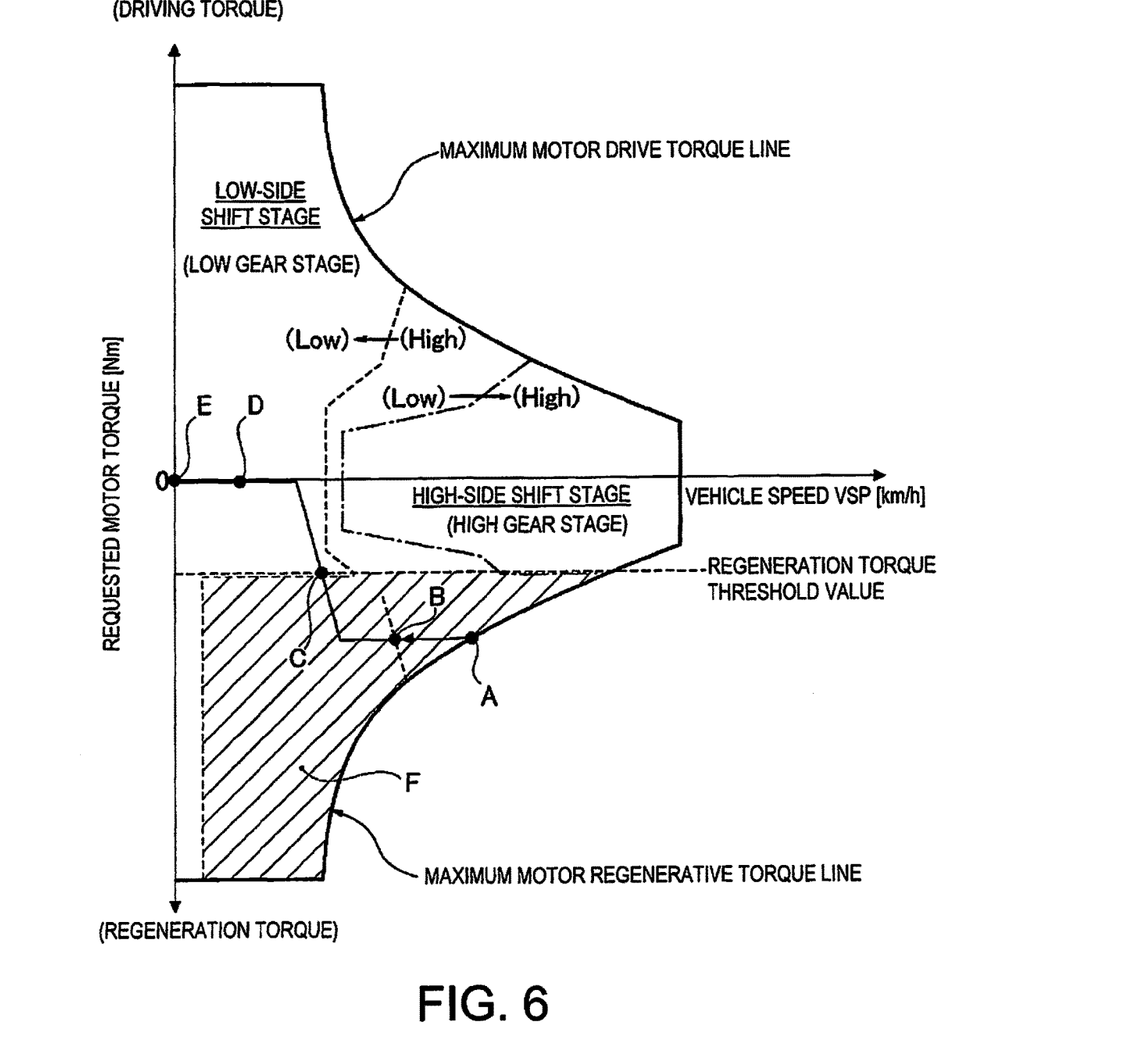
FIG. 6 is a shift map diagram showing examples of an upshift line, a downshift line, and a regeneration torque threshold value line of an automatic transmission used during regeneration when a gear-shift request is inputted.

An assumption shall be made that the operating point at the regenerative deceleration initiation time t0 as determined based on the vehicle speed VSP and the requested motor regeneration torque requested by the brake stroke level BST is in the high gear stage (point A in FIG. 6). After regenerative deceleration has been initiated, the operating point moves as the vehicle speed VSP decreases. At time t1 (point B in FIG. 6), when the downshift line (High→Low) of the shift map shown in FIG. 5 at which the motor operating point is optimal is crossed, a downgear-shift request is outputted. However, because the regeneration torque threshold value is equal to or less than the current regeneration torque when the downgear-shift request is outputted, downshift initiation is delayed.

As time elapses after time t1, the regeneration torque supplied via coordinated regeneration decreases as the vehicle speed VSP decreases, causing the current regeneration torque to approach the regeneration torque threshold value. At time t2 (point C in FIG. 6), when the regeneration torque threshold value becomes greater than the current regeneration torque and the operating point crosses the "regeneration torque threshold value" of the shift map shown in FIG. 6, a downshift is initiated. As time elapses after the downshift initiation time t2, the downshift progresses as regeneration torque approaches zero, thereby causing the downshift, which increases the motor speed constituting the transmission input rotational speed, to end at time t3 (point D in FIG. 6). Subsequently, with the regeneration torque at zero, the vehicle speed decreases as the motor speed decreases, and the vehicle stops at time t4 (point E in FIG. 6).

Specifically, when a gear-shift request is made during regeneration, the region F in the shift map shown in FIG. 6 in which the regeneration torque is equal to or greater than the "regeneration torque threshold value" is a shift delay region, and that part of the regeneration torque region in which the regeneration torque is less than the "regeneration torque threshold value" is a gear shifting permission region. Thus, when the regeneration torque during regeneration is low and the operating point is in the gear shifting permission region, shift control is performed as ordinary in response to a gear-shift request being made. Even when the regeneration torque during regeneration is high, shifting is initiated in response to a gear-shift request being made if the regeneration torque decreases and the operating point enters the gear shifting permission region.

In the first embodiment, as described above, when an assessment indicates that a gear-shift request using the engaging clutch 8c as a disengaging element or an engaging element has been made during deceleration/regeneration, the decision whether to grant gear shifting permission is made based on the magnitude of the regeneration torque, and if a decision to grant gear shifting permission is made, shifting is initiated according to the gear-shift request. Specifically, when a gear-shift request is made during deceleration/regeneration, the frequency at which shifting is possible increases so that shifting is initiated according to the gear shifting permission assessment based on the magnitude of the regeneration torque. The length of time for which the motor-generator MG can operate at an efficient operating point is thus increased over cases in which shifting is uniformly prohibited during deceleration/regeneration, improving motor efficiency. As a result, it is possible to improve the motor operating point when there is a gear-shift request during deceleration/regeneration, thereby improving electrical efficiency.

In the first embodiment, when loss of the torque transmitted via the drivetrain occurs due to a neutral state being entered during a gear shift transitional period using the engaging clutch 8c, a torque loss index value that is acceptable to the driver is set as a threshold value. When the torque loss index value yielded by the magnitude of the current regeneration torque is less than the threshold value, shifting is permitted. Thus, when a gear-shift request is made during deceleration/regeneration, shifting is permitted if the threshold value has not been reached, thereby allowing the level of torque loss produced by shifting to be kept equal to or less than a level of torque loss that is acceptable to the driver.

In the first embodiment, when torque loss occurs, an acceptable deceleration G fluctuation that is acceptable to the driver as a deceleration grade difference is determined, and a regeneration torque threshold value is calculated based on the determined acceptable deceleration G fluctuation, the gear ratio of the pre-shift gear stage, and vehicle factors. Using regeneration torque as a torque loss index value, when the current regeneration torque is less than the regeneration torque threshold value, shifting is permitted. Specifically, current regeneration torque can be precisely acquired using the torque command value of the motor-generator MG. It is therefore possible to improve electrical efficiency by improving the motor operating point, even during traveling conditions in which the deceleration G cannot be precisely detected (such as when traveling on gradients such as uphill or downhill slopes).

In the first embodiment, the value of the acceptable deceleration G fluctuation increases as vehicle speed VSP increases when calculating the regeneration torque threshold value. Specifically, driver shock sensitivity increases as vehicle speed VSP decreases, and driver shock sensitivity decreases as vehicle speed VSP increases. Thus, if the breadth of deceleration G fluctuation is the same regardless of vehicle speed VSP, the level or torque loss shock felt by the driver increases as the vehicle speed VSP decreases, and the torque loss shock felt by the driver decreases as the vehicle speed VSP increases. Thus, an acceptable deceleration G fluctuation such that the amount of shock felt by the driver does not change regardless of the vehicle speed VSP can be obtained, and the gear shifting permission region during regenerative deceleration at high vehicle speed ranges can be broadened.

In the first embodiment, the value of the acceptable deceleration G fluctuation increases as deceleration G increases when calculating the regeneration torque threshold value. Specifically, driver shock sensitivity increases as deceleration G decreases, and driver shock sensitivity decreases as deceleration G increases. Thus, if the breadth of deceleration G fluctuation is the same regardless of deceleration G, the level or torque loss shock felt by the driver increases as the deceleration G decreases, and the torque loss shock felt by the driver decreases as the deceleration G increases. Thus, an acceptable deceleration G fluctuation such that the amount of shock felt by the driver does not change regardless of the deceleration G can be obtained, and the gear shifting permission region during regenerative deceleration at high deceleration G ranges on uphill slopes and the like can be broadened.

In the first embodiment, the regeneration torque threshold value is calculated according to the following relationships: high vehicle weight, high vehicle speed, upward slope: high regeneration torque threshold value; and low vehicle weight, low vehicle speed, downward slope: low regeneration torque threshold value.

Next, the effects of the first embodiment will be described. The shift control device for an electric automobile according to the first embodiment yields the following effects.

(1) An electric vehicle (electric automobile) in which a motor-generator MG for implementing regeneration during deceleration and an automatic transmission 3 comprising a meshing clutch (engaging clutch 8c) as a shifting element are provided on a drivetrain extending from a drive source to a drive wheel in the electric vehicle, wherein the vehicle has (FIG. 3): gear-shift request assessment means for assessing whether a gear-shift request made during deceleration/regeneration is an upshift in which a disengaging element during reengagement gear shifting is the meshing clutch (engaging clutch 8c), or a downshift in which an engaging element during a reengagement gear shifting is the meshing clutch (engaging clutch 8c) (S1 in FIG. 3); gear shifting permission assessment means for assessing whether to grant gear shifting permission based on the magnitude of regeneration torque when an assessment indicates that a gear-shift request made during deceleration/regeneration is one using the meshing clutch (engaging clutch 8c) as a disengaging element or an engaging element (step S4 in FIG. 3); and gear-shift initiation means for initiating shifting of gears according to the gear-shift request when the gear shifting permission assessment means decides to grant gear shifting permission (S5 in FIG. 3). It is thus possible to improve the motor operating point when there is a gear-shift request during deceleration/regeneration, thereby improving electrical efficiency.

(2) When loss in the torque transmitted through the drivetrain occurs due to a neutral state being entered during a reengagement gear shift transitional period using the meshing clutch (engaging clutch 8c), the gear shifting permission assessment means (S4 in FIG. 3) sets, as a threshold value, a torque loss index value (regeneration torque) that is acceptable to a driver and permits shifting gears when a torque loss index value yielded by the magnitude of the current regeneration torque is less than the threshold value (FIG. 3). Thus, in addition to the effects of (1), shifting gear is permitted when a gear-shift request is made during deceleration/regeneration and the threshold value has not been reached, thereby allowing the level of torque loss produced by shifting gears to be kept equal to or less than a level of torque loss that is acceptable to the driver.

(3) There is provided regeneration torque threshold value calculation means (S3 in FIG. 3) that, when torque loss occurs, determines an acceptable deceleration G fluctuation that is acceptable to the driver as a deceleration grade difference, and calculates a regeneration torque threshold value based on the determined acceptable deceleration G fluctuation, the gear ratio of the pre-shift gear stage, and vehicle factors; and the gear shifting permission assessment means (S4 in FIG. 3) uses regeneration torque as a torque loss index value and permitting gear shifting when current regeneration torque is less than the regeneration torque threshold value (FIG. 3). Thus, in addition to the effects of (2), electrical efficiency can be improved by improving the motor operating point, even in traveling conditions in which the current deceleration G cannot be precisely detected.

(4) The regeneration torque threshold value calculation means (S3 in FIG. 3) sets a higher acceptable deceleration G fluctuation as vehicle speed VSP increases (FIG. 4). Thus, in addition to the effects of (3), an acceptable deceleration G fluctuation can be set such that the shock felt by the driver does not change regardless of vehicle speed VSP, and the gear shifting permission region during regenerative deceleration at high vehicle speed ranges can be broadened.

(5) The regeneration torque threshold value calculation means (S3 in FIG. 3) sets a higher acceptable deceleration G fluctuation as deceleration G increases (FIG. 4). Thus, in addition to the effects of (3) and (4), an acceptable deceleration G fluctuation can be set such that the shock felt by the driver does not change regardless of deceleration G, and the gear shifting permission region during regenerative deceleration at high deceleration G ranges can be broadened.

Embodiment 2

A second embodiment is an example using deceleration G as the torque loss index value instead of the regeneration torque used in the first embodiment.

Figure 8:
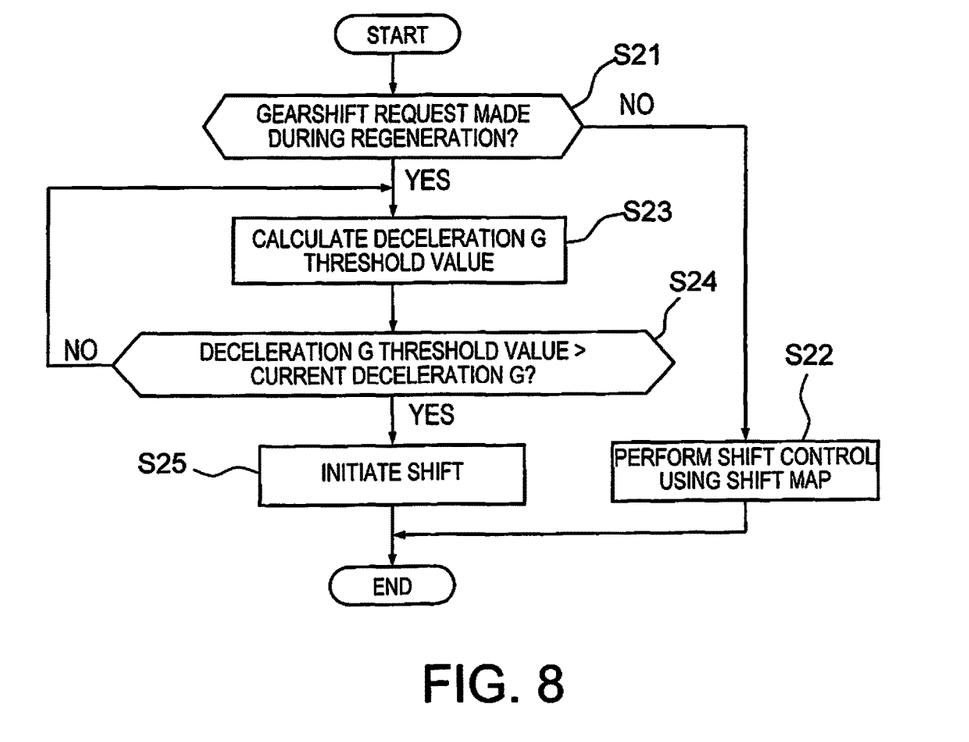
FIG. 8 is a flow chart showing a shift control process executed by a gear shifting controller of a second embodiment.

First, the configuration of the second embodiment will be described. FIG. 8 shows a shift control process executed by the gear shifting controller 21 of the second embodiment. The various steps making up the configuration of the shift control process will now be described with reference to FIG. 8.

In step S21, it is assessed whether an upshift or downgearshift request has been made during deceleration/regeneration. If YES (i.e., a gear-shift request has been made during regeneration), the process continues to step S23; if NO (i.e., a gear-shift request has not been made during regeneration), the process continues to step S22 (gear-shift request assessment means).

In step S22, following the assessment in step S21 indicating that a gear-shift request has not been made during regeneration, ordinary shift control based on a shift map (FIG. 5) is performed, and the process ends.

In step S23, following the assessment in step S21 indicating that a gear-shift request has been made during regeneration or the assessment in step S24 indicating that deceleration G magnitude conditions have not been met, a deceleration G threshold value (absolute value) is calculated, and the process continues to step S24 (deceleration G threshold value calculation means). When loss in the torque being transmitted through the drivetrain occurs due to a momentary neutral state being entered during a gear shift transitional period using the engaging clutch 8c, the deceleration G threshold value is calculated on the acceptable deceleration G fluctuation that is acceptable to the driver as a deceleration grade difference. Specifically, the value is determined using the acceptable deceleration G fluctuation map shown in FIG. 4. Specifically, the value for acceptable deceleration G fluctuation increases as the vehicle speed indicated by the vehicle speed sensor 22 increases, and the value for acceptable deceleration G fluctuation increases as the actual deceleration absolute value indicated by the forward/reverse G sensor 25 increases.

In step S24, following the calculation of the deceleration G threshold value in step S23, an assessment is made as to whether to grant gear shifting permission based on whether the current magnitude of deceleration G (absolute value of deceleration G) is less than the deceleration G threshold value calculated in step S23. If YES (i.e., deceleration G threshold value>current deceleration G), the process continues to step S25; if NO (i.e., deceleration G threshold value≤current deceleration G), the process returns to step S23 (gear shifting permission assessment means).

In step S25, following the assessment in step S24 indicating that the deceleration G threshold value is greater than the current deceleration G, shifting is initiated according to the gear-shift request (upshift or downshift) from step S21, and the process ends (gear-shift initiation means). The other features of FIGS. 1 and 2 are similar to those of the first embodiment, and thus will be neither described nor illustrated.

Figure 9:
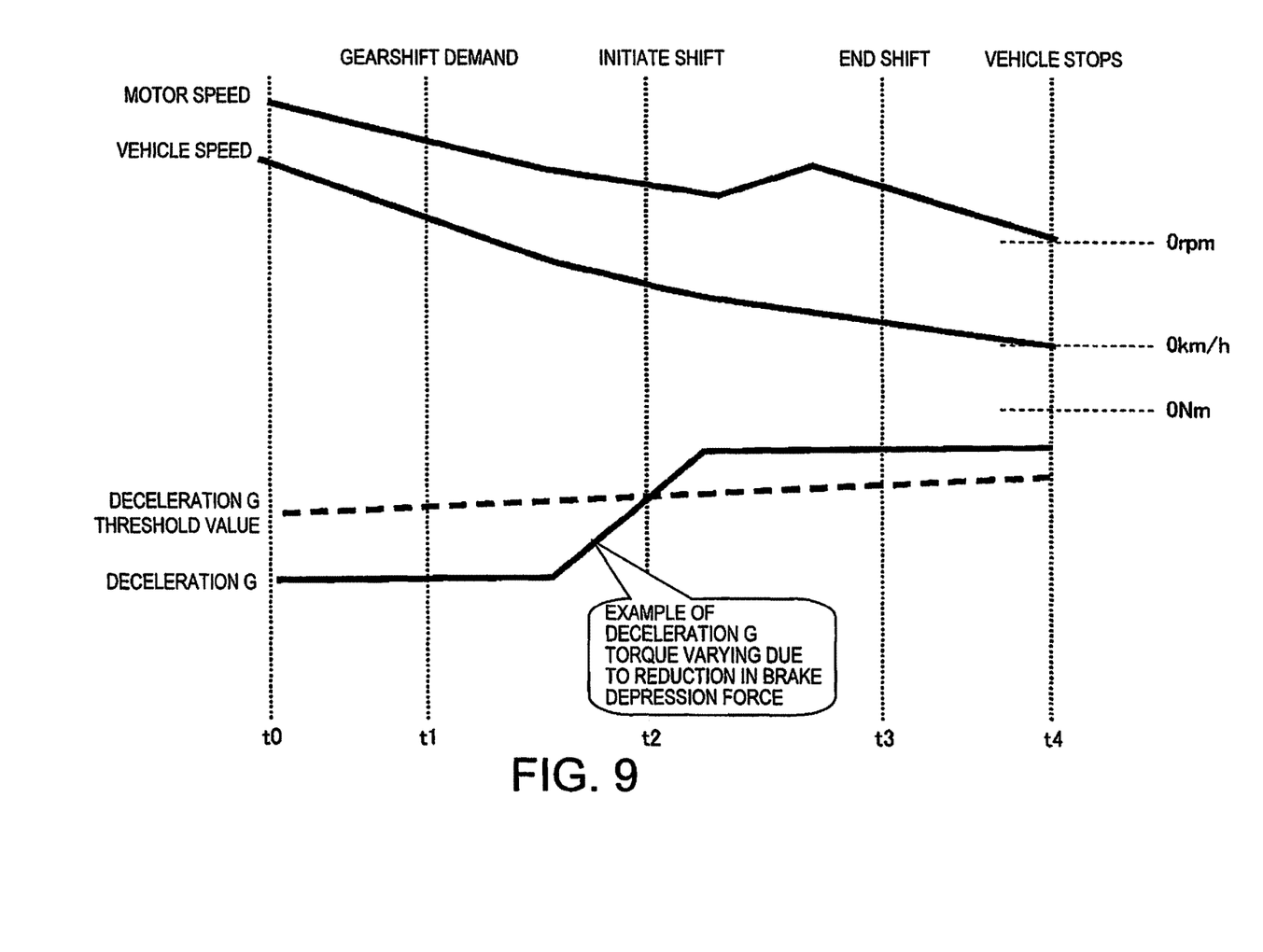
FIG. 9 is a time chart showing the properties of motor speed, vehicle speed, deceleration G threshold value, and deceleration G when a downgear-shift request is inputted during a regenerative deceleration until coming to a stop in an electric automobile equipped with the shift control device of the second embodiment.

Next, the operation of the second embodiment will be described. The operation of shift control performed when a downgear-shift request is made during the period from when an electric automobile equipped with the shift control device of the second embodiment begins regenerative deceleration to when the vehicle stops will be described using the time chart shown in FIG. 9. In FIG. 9, t0 is a regenerative deceleration initiation time, t1 is a gear-shift request time, t2 is a shift initiation time, t3 is a shift ending time, and t4 is a vehicle stop time.

An assumption shall be made that the operating point at the regenerative deceleration initiation time t0 as determined based on the vehicle speed VSP and the requested motor regeneration torque requested by the brake stroke level BST is in the high gear stage. After regenerative deceleration has been initiated, the operating point moves as the vehicle speed VSP decreases. At time t1, when the downshift line (High→Low) of the shift map shown in FIG. 5 at which the motor operating point is optimal is crossed, a downgear-shift request is outputted. However, because the deceleration G threshold value is equal to or less than the current deceleration G when the downgear-shift request is outputted, downshift initiation is delayed.

As time elapses after time t1, brake depression force decreases so as to suppress abrupt drops in vehicle speed VSP, causing the deceleration G to decrease, so that the current deceleration G approaches the deceleration G threshold value. At time t2, when the deceleration G threshold value becomes greater than the current deceleration G and the operating point crosses the deceleration G threshold value, a downshift is initiated. As time elapses after the downshift initiation time t2, the downshift progresses as deceleration G is suppressed, thereby causing the downshift, which increases the motor speed constituting the transmission input rotational speed, to end at time t3. Subsequently, with deceleration G kept low, the vehicle speed decreases as the motor speed decreases, and the vehicle stops at time t4.

Thus, in the second embodiment, an acceptable deceleration G fluctuation that is acceptable to the driver as a deceleration grade difference is calculated as the deceleration G threshold value when torque loss occurs. Using deceleration G as a torque loss index value, when the current deceleration G is less than the deceleration G threshold value, shifting is permitted. Specifically, rather than providing a regeneration torque threshold value as in the first embodiment, a threshold value is provided for the deceleration G detected by the forward/reverse G sensor 25 with which the vehicle is equipped, after which an assessment as to whether to grant gear shifting permission is made. Shifting can thus be permitted when deceleration G, improving electrical efficiency, irrespective of whether regeneration torque is high due to being on an uphill slope or the like. The operation of the second embodiment is otherwise similar to that of the first embodiment; thus, description thereof will be omitted.

Next, the effects of the second embodiment will be described. The shift control device for an electric automobile according to the second embodiment yields the following effects.

(6) Deceleration G threshold value calculation means (S23 in FIG. 8) is comprised that calculates an acceptable deceleration G fluctuation that is acceptable to the driver as a deceleration grade difference as a deceleration G threshold value when torque loss occurs; and the gear shifting permission assessment means (S24 in FIG. 8) uses deceleration G as a torque loss index value and permits shifting when current deceleration G is less than the deceleration G threshold value (FIG. 8). Thus, in addition to the effects of (2), the frequency at which shifting is permitted increases, allowing for improved electrical efficiency, during low deceleration G traveling conditions even if regeneration torque is high.

The device for controlling gear shifting in an electric vehicle according to the present invention have been described above based on first and second embodiments, but the specific configuration of the present invention is not limited to these embodiments, and various modifications and additions may be made to the design thereof to the extent that they do not depart from the gist of the invention as set forth in the claims.

The first and second embodiments are examples of automatic transmissions comprising an engaging clutch 8c and a friction clutch 9c and having two shift stages, a high gear stage and a low gear stage. However, the automatic transmission may have three or more shift stages as long as it comprises a meshing clutch (dog clutch, synchro clutch) as a shifting element, and a shift stage in which the meshing clutch is a disengaging element or an engaging element.

The first and second embodiments are examples in which regeneration torque (first embodiment) and deceleration G (second embodiment) are used as torque loss index values. However, another value may be used as a torque loss index value as long as the value serves as an index of torque loss, such as a value found by combining regeneration torque and deceleration G.

The first and second embodiments are examples in which the threshold value for the torque loss index value (regeneration torque, deceleration G) is a calculated variable value. However, a fixed value determined in advance via experimentation may also be set as the threshold value for the torque loss index value (regeneration torque, deceleration G).

Figure 10:
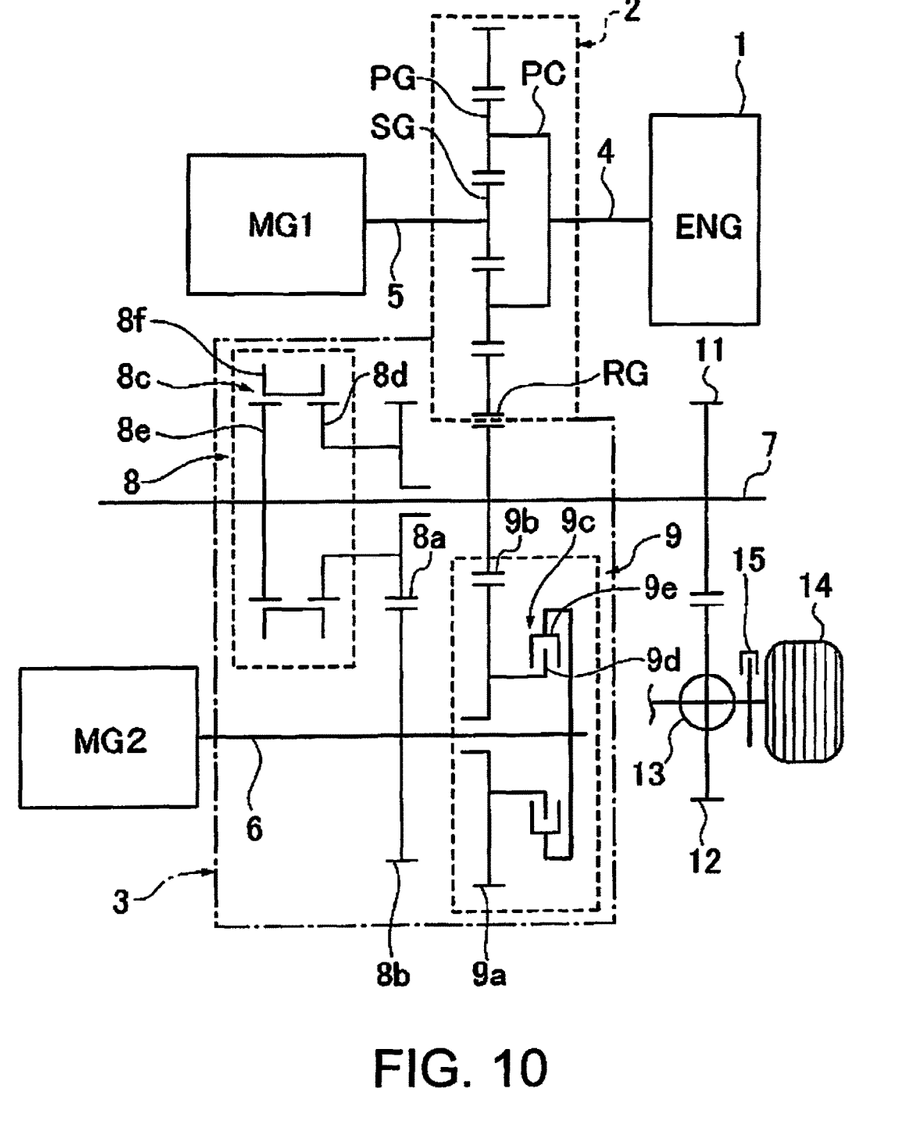
FIG. 10 is a diagram showing one example of a drivetrain configuration of a hybrid vehicle (another example of an electric vehicle) to which the shift control device of the present invention can be applied.

The first and second embodiments are examples in which the shift control device according to the present invention is applied to an electric automobile provided with a motor-generator as a drive source. However, the shift control device according to the present invention can also be applied to a hybrid vehicle provided with an engine and a motor-generator as drive sources. An example of a hybrid vehicle provided with an engine and two motor-generators as drive sources is a vehicle having the drivetrain of the first or second embodiment to which an engine 1, a power-generating motor-generator MG1, and a power distribution device 2 have been added. In this case, the shift control according to the can be present invention, when the engine 1 and the power-generating motor-generator MG1 are in a state of zero torque, and the automatic transmission 3 shifts while the driving motor-generator MG2 is engaged in regeneration, as shown in FIG. 10.

The invention claimed is:

1. An electric vehicle gear shifting control device for controlling gear shifting in an electric vehicle having a motor-generator for implementing regeneration during deceleration, and an automatic transmission having a meshing clutch as a shifting element, the motor-generator and the meshing clutch being provided in a drivetrain extending from a drive source to a drive wheel in the electric vehicle; the electric vehicle gearshift control device comprising:
a gear shifting controller programmed to
assess whether to grant a gear shifting permission based on whether a deceleration grade difference occurring as a result of a reengagement gear shifting is less than a predetermined deceleration G fluctuation when a reengagement gear shift request involving disengaging or engaging the meshing clutch is made during deceleration or regeneration; and
initiate shifting of gears according to the gear-shift request upon deciding to grant gear shifting permission, when loss in the torque transmitted through the drivetrain occurs due to a neutral state being entered during a reengagement gear shift transitional period using the meshing clutch, the gear shifting controller is further programmed to set as, a threshold value, a predetermined torque loss index value, and to permit shifting gears when a torque loss index value yielded by the magnitude of the current regeneration torque is less than the threshold value.

2. The electric vehicle gear shifting control device according to claim 1, wherein
the gear shifting controller is further programmed to determine when torque loss occurs, a predetermined deceleration G fluctuation as a deceleration grade difference, and to calculate a regeneration torque threshold value based on the determined acceptable deceleration G fluctuation, the gear ratio of the pre-shift gear stage, and vehicle factors; and
the gear shifting controller is further programmed to use regeneration torque as a torque loss index value and to permit gear shifting when current regeneration torque is less than the regeneration torque threshold value.

3. The electric vehicle gear shifting control device according to claim 2, wherein
the gear shifting controller is further programmed to set a higher acceptable deceleration G fluctuation as vehicle speed increases.

4. The electric vehicle gear shifting control device according to claim 3, wherein
the gear shifting controller is further programmed to set a higher acceptable deceleration G fluctuation as deceleration G increases.

5. The electric vehicle gear shifting control device according to claim 2, wherein
the gear shifting controller is further programmed to set a higher acceptable deceleration G fluctuation as deceleration G increases.

6. The electric vehicle gear shifting control device according to claim 1, wherein
the gear shifting controller is further programmed to calculate, as a deceleration G threshold value, the predetermined deceleration G fluctuation as a deceleration grade difference when torque loss occurs;
the gear shifting controller is further programmed to use deceleration G as the torque loss index value and to permit gear shifting when current deceleration G is less than the deceleration G threshold value.

* * * * *